(12) United States Patent
Craggs et al.

(10) Patent No.: US 11,727,368 B1
(45) Date of Patent: *Aug. 15, 2023

(54) VIDEO CALL FLASH PAYMENT

(71) Applicant: AppDirect, Inc., San Francisco, CA (US)

(72) Inventors: Daniel P. Craggs, Montreal (CA); Vadim Rudman, Montreal (CA); David Dubé, Montreal (CA)

(73) Assignee: AppDirect, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,486

(22) Filed: Sep. 10, 2021

Related U.S. Application Data (63) Continuation of application No. 16/915,882, filed on Jun. 29, 2020, now Pat. No. 11,126,977.

(51) Int. Cl.
*G06Q 20/08* (2012.01)
*G06Q 10/1093* (2023.01)
(Continued)

(52) U.S. Cl.
CPC ....... *G06Q 20/085* (2013.01); *G06Q 10/1095* (2013.01); *G06Q 20/34* (2013.01); *G06Q 20/401* (2013.01); *G06Q 30/0284* (2013.01); *G06Q 30/04* (2013.01); *H04L 63/08* (2013.01); *H04M 15/8207* (2013.01); *H04M 15/8355* (2013.01);
(Continued)

(58) Field of Classification Search
CPC combination set(s) only.
See application file for complete search history.

(56) References Cited

U.S. PATENT DOCUMENTS

2006/0045253 A1  3/2006  Bieselin
2013/0007630 A1  1/2013  Dolgin
(Continued)

OTHER PUBLICATIONS

Creating a Credit Card Scanner using Firebase MLKit [Online] https://medium com/coding-blocks/creating-a-credit-card-scanner-using-firebase-mlkit-5345140f6a5c Accessed: May 26, 2020.
(Continued)

*Primary Examiner* — Phung-Hoang J Nguyen
(74) *Attorney, Agent, or Firm* — McDermott Will & Emery LLP (57) ABSTRACT

Various aspects of the subject technology relate to completing a payment over a video call. A method includes initiating, a video call between a user and a vendor, the user and the vendor having a scheduled appointment comprising a specified duration of time. The method also includes directing the user to the video call through video call software. The method also includes receiving, from the video call software, a notification that the video call ended, the notification comprising video call metadata. The method also includes calculating, through an online marketplace, a total cost of the scheduled appointment based at least on the video call metadata and marketplace data. The method also includes generating, through the online marketplace, an invoice based on the total cost. The method also includes receiving payment information from the user regarding the invoice. According to aspects, the method includes a flash-to-pay option for payment.

20 Claims, 6 Drawing Sheets

(51) Int. Cl.
*G06Q 30/04* (2012.01)
*G06Q 30/0283* (2023.01)
*G06Q 20/40* (2012.01)
*H04L 9/40* (2022.01)
*H04N 7/14* (2006.01)
*H04M 15/00* (2006.01)
*G06Q 20/34* (2012.01)

(52) U.S. Cl.
CPC ....... *H04N 7/147* (2013.01); *H04L 2463/082* (2013.01)

(56) References Cited

U.S. PATENT DOCUMENTS

| | | |
|---|---|---|
| 2015/0201314 A1 | 7/2015 | Swamy et al. |
| 2016/0112577 A1 | 4/2016 | Guday |
| 2017/0372297 A1* | 12/2017 | Zhang ................. G06Q 20/382 |
| 2019/0199761 A1 | 6/2019 | Felman |
| 2019/0340663 A1 | 11/2019 | Beckham |
| 2020/0104942 A1* | 4/2020 | Riechers .............. G06Q 20/227 |
| 2021/0406897 A1* | 12/2021 | He ....................... G06K 9/6232 |

OTHER PUBLICATIONS

Web RTC [Online] https://webrtc.org/ Accessed: Jun. 22, 2020.
US Receiving Office—International Search Report and Written Opinion for corresponding International Application No. PCT/US2021/039455 dated Jul. 23, 2021; 8 pgs.

\* cited by examiner

VIDEO CALL FLASH PAYMENT

CROSS REFERENCE TO RELATED APPLICATIONS

This present application claims the benefit of priority under 35 U.S.C. 120 as a continuation of U.S. patent application Ser. No. 16/915,882, filed Jun. 29, 2020, now allowed, the disclosure of which is hereby incorporated by reference in its entirety for all purposes.

TECHNICAL FIELD

The present disclosure generally relates to contactless payments, and more particularly to completing payment during and using an online meeting.

BACKGROUND

Conventionally, appointments between a customer and a vendor of services generally take place in-person. With advancements in videoconferencing technology, such appointments may take place virtually online instead. The convenience of meeting remotely has many advantages, and the general public has begun to embrace online meetings.

BRIEF SUMMARY

The subject disclosure addresses shortcomings in existing technologies by providing for completing payment over an online meeting. According to an aspect, when an appointment is over, a professional can initiate a payment process with a user. The amount to be charged may be calculated by a rate that is provided by a marketplace. Video call software may then call the marketplace with a meeting summary that contains online call metadata. The metadata is used to calculate a cost of the appointment. Once the cost is calculated by the marketplace, it then returns this value to the video call software, which provides a user interface (UI) indication to the user of a payment amount and asks them to confirm payment. The user then confirms the payment by displaying a credit card that was registered earlier by the user through the marketplace (e.g., flash-to-pay). The video call software then uses credit card scanning software to detect the credit card and find payment details. The credit card details are identified and sent to the marketplace for processing and completion of the payment.

According to one embodiment of the present disclosure, a computer-implemented method is provided for completing a payment over a video call. The method includes initiating, by a user through an online marketplace, a video call between the user and a vendor, the user and the vendor having a scheduled appointment with each other, the scheduled appointment comprising a specified duration of time. The method also includes directing, by the online marketplace, the user to the video call through video call software during the specified duration of time. The method also includes receiving, from the video call software, a notification that the video call has ended, the notification comprising video call metadata. The method also includes calculating, through the online marketplace, a total cost of the scheduled appointment based at least in part on the video call metadata and marketplace data. The method also includes generating, through the online marketplace, an invoice based on the total cost. The method also includes receiving payment information from the user in regards to the invoice.

According to one embodiment of the present disclosure, a system is provided including a processor and a memory comprising instructions stored thereon, which when executed by the processor, causes the processor to perform a method for completing a payment over a video call. The method includes initiating, by a user through an online marketplace, a video call between the user and a vendor, the user and the vendor having a scheduled appointment with each other, the scheduled appointment comprising a specified duration of time. The method also includes directing, by the online marketplace, the user to the video call through video call software during the specified duration of time. The method also includes receiving, from the video call software, a notification that the video call has ended, the notification comprising video call metadata. The method also includes calculating, through the online marketplace, a total cost of the scheduled appointment based at least in part on the video call metadata and marketplace data. The method also includes generating, through the online marketplace, an invoice based on the total cost. The method also includes receiving payment information from the user in regards to the invoice.

According to one embodiment of the present disclosure, a non-transitory computer-readable storage medium is provided including instructions (e.g., stored sequences of instructions) that, when executed by a processor, cause the processor to perform a method for completing a payment over a video call. The method includes initiating, by a user through an online marketplace, a video call between the user and a vendor, the user and the vendor having a scheduled appointment with each other, the scheduled appointment comprising a specified duration of time. The method also includes directing, by the online marketplace, the user to the video call through video call software during the specified duration of time. The method also includes receiving, from the video call software, a notification that the video call has ended, the notification comprising video call metadata. The method also includes calculating, through the online marketplace, a total cost of the scheduled appointment based at least in part on the video call metadata and marketplace data. The method also includes generating, through the online marketplace, an invoice based on the total cost. The method also includes receiving payment information from the user in regards to the invoice.

According to one embodiment of the present disclosure, a system is provided that includes means for storing instructions, and means for executing the stored instructions that, when executed by the means, cause the means to perform a method for completing a payment over a video call. The method includes initiating, by a user through an online marketplace, a video call between the user and a vendor, the user and the vendor having a scheduled appointment with each other, the scheduled appointment comprising a specified duration of time. The method also includes directing, by the online marketplace, the user to the video call through video call software during the specified duration of time. The method also includes receiving, from the video call software, a notification that the video call has ended, the notification comprising video call metadata. The method also includes calculating, through the online marketplace, a total cost of the scheduled appointment based at least in part on the video call metadata and marketplace data. The method also includes generating, through the online marketplace, an invoice based on the total cost. The method also includes receiving payment information from the user in regards to the invoice.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Conventionally, appointments between a customer and a vendor of services generally take place in-person. With advancements in videoconferencing technology, such appointments may take place virtually online instead. The convenience of meeting remotely has many advantages, and the general public has begun to embrace online meetings. Although online payments are common, there is currently no ability to pay a vendor directly at the conclusion of a virtual appointment.

As a result, compared to in-person meetings, online meetings still lag behind in convenience, even though services are increasingly being provided through an online environment. For example, to schedule an online meeting, both parties need to come to agreements and often have to organize many of the details themselves. Moreover, where payments can be handled by a simple tap (e.g., contactless payments) of a credit card during in-person meetings, online meeting payments can be insecure and rely on trust. Often, credit card information needs to be disclosed orally or sent over the Internet in insecure ways. These payment and organizational factors can be real deterrents to participating in and consuming online services.

Aspects of the present disclosure solve these problems by having online appointments handled by an online marketplace that allows providers the ability to offer their product through the marketplace. Further, the online video conference will simulate the simplicity of the in-person contactless option with a flash-to-pay option. Once a payment is needed to be made, the consumer simply needs to show their credit card to the webcam to initiate a payment. This can trigger a two-factor authentication (2FA) process. Since the marketplace will already hold the consumer's data, the invention will leverage that to automate the payment process.

Additional aspects of the present disclosure provide for video call flash payments. In an implementation, both a professional and a client are registered in a marketplace. The professional establishes their pay rate (e.g., either as a rate or as a one-time fee) through a marketplace product. The client registers their two-factor authentication details and their payment method, and then subscribes to the professional's product. An online meeting is arranged via the marketplace with a scheduling interface, or alternatively a drop-in mechanism.

According to aspects, once the marketplace has established an appointment between a professional and a client, they are both directed to a video call using a video call platform (e.g., redirected from the marketplace to the video call platform). This video call platform may include a third party integration, or be an in-house video calling platform (e.g., a video call platform). For example, the in-house video calling platform may be built through Web Real-Time Communication (WebRTC). The user is only transferred to the video call when the professional allows them entry, or when a set of configured criteria are met (e.g., an empty room, or it has reached the appointment time).

In an implementation, when the appointment is over, the professional can initiate the payment process. Alternatively, this can be initiated automatically by a time threshold passing (e.g., end of scheduled appointment). The amount to be charged is calculated by the rate that is provided by the marketplace. The video call software then calls the marketplace with a meeting summary that contains the online call metadata. This metadata is used to calculate the cost of the appointment. For example, the metadata may include a call duration. The metadata may also include complex parameters, such as duration of call that professional's face was visible (e.g., using facial recognition techniques).

Once the cost is calculated by the marketplace, it then returns this value to the video call software, which provides a user interface (UI) indication to the user of the payment amount and asks them to confirm payment. This user then confirms their payment by displaying their credit card which they had registered earlier through the marketplace. The video call software then uses credit card scanning software to detect the credit card and find the details. Either the credit card details are identified and sent to the marketplace, or the image itself is sent to the marketplace, so that the marketplace can scan the credit card directly to detect the details instead.

According to aspects, the marketplace cross checks this information with the user's existing payment methods to ensure there is a match. If there is a match it can then use 2FA with the user so that the user can confirm on their phone or alternative 2FA device that they accept this payment.

If there's no match, the payment fails and the user is prompted to try again or be redirected (e.g., directed) to the marketplace to register their current credit card. Once a match is found and it is confirmed by 2FA (if enabled), the payment is processed and the video call software is notified of the result. If it has failed, the user can retry. If it is successful, the user and professional can be notified visually via the video call software and the appointment may end. The invoice in the marketplace is also updated as paid. If a user fails to make payment during their call, then their invoice will be left as unpaid. In an embodiment, flash-to-pay may be an optional preference for the user and the user can be charged automatically at the end of the meeting.

The disclosed system addresses a problem in traditional payment techniques tied to computer technology, namely, the technical problem of securely completing a contactless payment over a video call. The disclosed system solves this technical problem by providing a solution also rooted in computer technology, namely, by providing for secure contactless payment at the conclusion of an online appointment. The disclosed subject technology further provides improvements to the functioning of the computer itself because it improves processing and efficiency in online payments.

Figure 1:
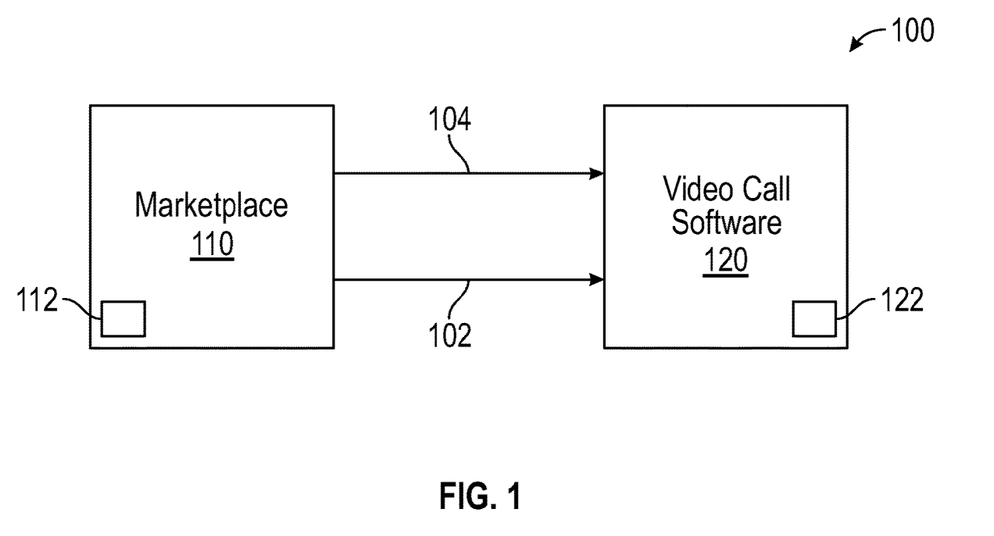
FIG. 1 illustrates an exemplary system for completing a payment over a video call, according to certain aspects of the disclosure.

FIG. 1 illustrates an exemplary system 100 for completing a payment over a video call, according to certain aspects of the disclosure. The system 100 may include a marketplace (e.g., an online marketplace) 110 and a video call platform (e.g., video call software) 120.

According to aspects, a user may store their payment and phone details through a user account 112 in the marketplace 110. The user account 112 may also store additional information regarding the user, including, but not limited to, notification preferences, preferred payment methods (e.g., credit card numbers, debit card numbers, etc.), billing addresses, etc. The user may also view available vendors through the marketplace 110 and schedule online appointments with vendors of their choice to have a video call 122.

Upon scheduling an online appointment, the user may then utilize the marketplace 110 to join their online appointment. For example, the marketplace 110 may redirect (e.g., direct) the user from a marketplace interface to the video call platform 120. The user may then have a video call 122 with a vendor.

In an implementation, the user may be a patient, and the vendor may be a doctor (or physician). The user may view, through the marketplace 110, information regarding services offered by the doctor (and other doctors/physicians as well), such as a consultation. The user may also receive, through the marketplace 110, information regarding a cost of the consultation with the doctor. The user may then schedule a consultation with a doctor of their choice through the marketplace 110. The consultation may take place at a scheduled appointment time for a predetermined period of time (e.g., one hour, 30 minutes, etc.). Once the scheduled appointment time arrives, the user may login to the marketplace 110 and be redirected (e.g., directed) to the video call platform 120 for the video call 122 with the doctor. According to aspects, the user may receive a reminder from the marketplace 110 of the appointment, so that the user may login for the appointment.

Once the online appointment ends, the video call platform may send video call metadata 104 to the marketplace 110. For example, the video call 122 may end either through termination by one or both of the user and/or the vendor. The video call 122 may also automatically terminate after a predetermined period of time. For example, if the online appointment was for a 30-minute consultation, then the video call 122 may automatically end after 30 minutes.

In an implementation, the video call platform 120 may notify the parties that their time is almost up (e.g., five minute minutes left, one minute left, etc.), and that in order to avoid additional charges, the video call 122 should be timely terminated. For example, if the vendor charges hourly/by the minute, etc., then the user may be notified that the additional charges would apply. If the vendor does not charge based on a length of the video call 122, then it may be possible for the parties to continue the video call 122 without additional charges as long as the parties have availability to continue the video call 122.

In an implementation, the video call 122 may continue past the predetermined period of time based on availability of the vendor. According to additional aspects, the video call 122 may be drop-in based, without an appointment ahead of time. If other users are waiting (e.g., through an online queue) to have a video call 122 with the vendor, then the video call 122 may be terminated (e.g., after an allotted time, a queue limit has been reached, etc.) to allow the other users an opportunity to speak with the vendor.

According to aspects, a cost is calculated based on the video call metadata 104 and marketplace data. For example, the video call metadata 104 may include a duration (e.g., length of time) of the video call 122, how often the vendor spoke during the video call 122, a video call start time, a video call end time, etc. The marketplace data may include information regarding cost of the vendor, user details, the user account information 112, etc.

Once calculated, the cost 102 may be sent to the video call platform 120, and an invoice may be generated (e.g., through the marketplace 110). The video call platform 120 may then prompt the user to pay the amount (e.g., cost 102). For example, the video call 122 may visually display the invoice, including the cost 102, to the user. The user may review the cost 102, and determine whether to pay or dispute the cost 102.

According to aspects, if the user chooses to pay, then the user may display a credit card to their webcam. The video call platform 120 may be configured to identify credit card information (e.g., credit card number, CVV number, expiration date, card owner name, etc.) from a video image of the displayed credit card. The video call platform 120 may then identify needed information (e.g., credit card details) from the credit card for processing payment, and may send the credit card details to the marketplace 110. For example, the credit card details may be sent as an image of the credit card, or may be the credit card details themselves extracted from the video image of the credit card.

According to aspects, the marketplace 110 may receive the credit card details from the video call platform 120 and compare the credit card details with stored payment information of the user 112. For example, the user may have stored information regarding at least one credit card in their account 112. The user may also have designated credit card payments as a preferred method of payment. If the payment method provided by the video call platform matches the payment method found in the marketplace 110, a payment process may be initiated to complete the transaction between the user and the vendor. According to aspects, if the payment is not successful, an error message is sent to the video call platform 120 detailing why payment failed.

In an implementation, two-factor authentication (2FA) may be enabled by the user (e.g., through use account 112), and so the user will receive a 2FA prompt before payment is processed. If the user declines to pay, or the 2FA fails, an error message is sent to the video call platform 120 detailing why the payment failed. If the payment is successful, the marketplace 110 notifies the video call platform 120, and the video call 122 participants may view a confirmation that the payment was successful and that the invoice 102 is set to paid.

In an implementation, if the payment method (e.g., credit card information and/or user payment preferences) does not match the payment method stored in the marketplace 110, the marketplace 110 notifies the video call platform of a missing payment method. The video call platform 120 may then prompt the user to retry. The video call platform 120 may also redirect (e.g., direct) the user to the marketplace 110 to register their credit card and then retry.

Figure 2:
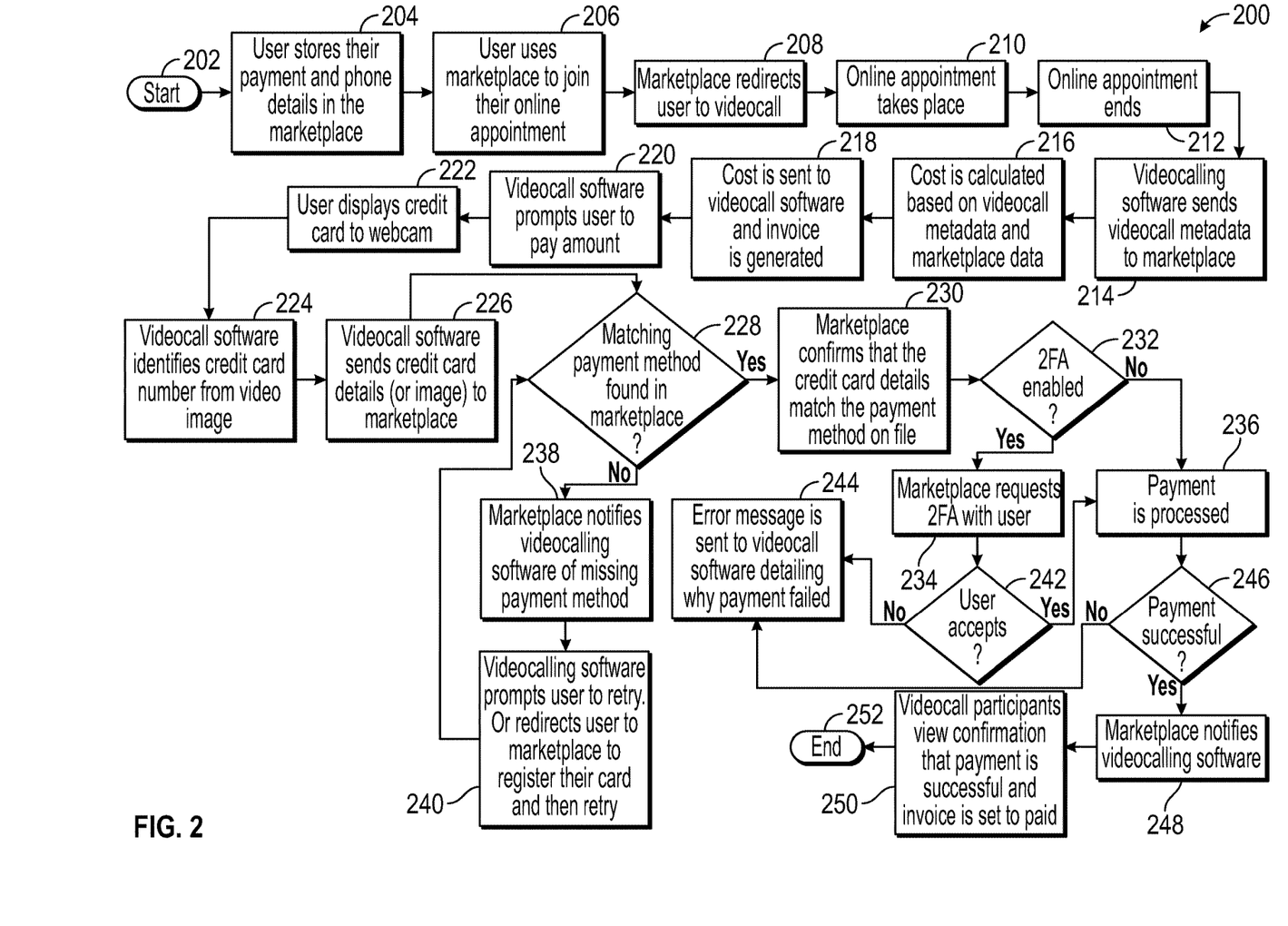
FIG. 2 illustrates an exemplary process flow for completing a payment over a video call, according to certain aspects of the disclosure.

FIG. 2 illustrates an exemplary process flow 200 for completing a payment over a video call, according to certain aspects of the disclosure. The process flow 200 may begin at block 202 with a user (e.g., a customer) storing their payment and phone details in a marketplace, at block 204. For example, this may be a part of a registration process for utilizing and accessing the marketplace. The user may then schedule an appointment and join into the appointment, at block 206. According to aspects, the user may also drop into an appointment through a tile on the marketplace. For example, the tile may include an icon relating to a product/service that the user may click that will then take the user to their online appointment regarding the product/service.

In an implementation a professional (e.g., a vendor) may set up a tile on the marketplace and may include provisions and services through accessing the tile. The user may then access the tile and, for example, read reviews regarding the professional through the marketplace. The user may then choose to purchase a product/service offered by the professional. The user may also schedule an appointment with the professional to discuss the product/service.

According to aspects, when it is time for the appointment, the user may, for example, click on the tile, and the marketplace will direct them to video call software (e.g., a video call platform) for the video call (e.g., redirect from the marketplace to the video call software), at block 208. The appointment then takes place, at block 210. The appointment may then end, at block 212. For example, the appointment ending may be triggered by a certain time threshold that is met, or it may be triggered by the user themselves. According to an aspect, the video call software may detect the user stating, for example, "Okay, the appointment is now ended," or the like. The user may also state, "It is time to move into the payment phase," or something similar. For example, the video call software may be configured to detect specific key phrases, which may then trigger proceeding to an invoicing and payment phase of the video call.

The video call software may then send video call metadata to the marketplace, at block 214. For example, the video call software may be integrated with the marketplace such that the video call software may call back to the marketplace to send information including, but not limited to, a duration of the video call. According to aspects, the video call metadata may include information regarding a length of time that the professional's face was detected by the professional's webcam. For example, if the professional charges by the minute, and the professional steps out for a few minutes, then the user should not be charged for that time the professional was away. According to aspects, an itinerary may be created by either or both of the user and the professional (e.g., through the marketplace), and the metadata may reflect the itinerary. For example, if there is a scheduled break during the meeting (e.g., appointment), then there will be no charges for the break.

A cost may be calculated (e.g., by the marketplace) based on the video call metadata and marketplace data, at block 216. For example, the marketplace data may include information regarding cost of the vendor, user details, the user account information, etc. Once calculated, the cost may be sent to the video call software and an invoice may be generated, at block 218.

The user may be prompted by the video call software to pay the invoice, at block 220. For example, the user may review the invoice before deciding to pay, so that the user knows what they are being charged for. The user may display a credit card to the user's webcam, at block 222. According to aspects, the video call software may be configured with recognition software (e.g., optical character recognition (OCR), or the like) to recognize details of the credit card (e.g., credit card number, CVV number, expiration date, card owner name, etc.) from a video image of the credit card, at block 224. The credit card details may be extracted and sent to the marketplace, at block 226. In an implementation, the video call software may take a digital image (e.g., a digital photo) of the credit card, and send the digital image to the marketplace. According to aspects, processing of recognition of the credit card may be accomplished through either the video call software or the marketplace.

Once the credit card details (e.g., either in extracted form or an image) are received by the marketplace, the marketplace may confirm whether an existing payment method exists in the marketplace already, at block 228. For example, the credit card details may be matched with payment information and preferences from the user's profile in the marketplace. If there is no match, then the marketplace may notify the video call software of a missing payment method, at block 238. The video call software may then prompt the user that the payment did not go through, at block 240. For example, the user may be prompted that the credit card did not work, and may be given options to either try the credit card again, or to register the credit card, if it has not yet been registered. The video call software may also provide a link to go register the payment method in the marketplace.

According to aspects, the user may not have enabled a flash-to-pay option. For example, the flash-to-pay option would enable the recognition software of the video call software to recognize details of the credit card. In an implementation, the user may enable an option to pay without having to show their credit card to the user's webcam. For example, the user may allow the marketplace to process the payment automatically upon approval by the user of the invoice, at block 222. The method of payment would have been previously selected by the user through the user's marketplace account, such as through a credit card (e.g., a preferred payment credit card), or the like. According to aspects, once the user has registered the payment method, they may go through that flow again (e.g., beginning at block 228), show the credit card, and this time, the payment should be confirmed by the marketplace. Requiring matching of the user's credit card details with what is stored by the marketplace is also an added security measure to prevent fraud.

Once the marketplace confirms that the credit card details match, at block 230, a check may be done to confirm whether two-factor authentication (2FA) is enabled by the user, at block 232. For example, the user may have chosen to have 2FA enabled through their marketplace account. According to aspects, the professional may require 2FA for accepting payment (e.g., through a professional configuration in the marketplace). According to aspects, the marketplace may require 2FA.

If 2FA is enabled, then the marketplace will initiate 2FA with the user, at block 234. For example, the marketplace may send a message (e.g., SMS, push notification, e-mail, etc.) to the user. The user may then choose whether or not to confirm (e.g., accept) the payment, at block 242. In an implementation, a push notification may be sent to the mobile device of the user, and then that push notification is confirmed by the user. If the user confirms, then the marketplace proceeds with processing the payment, at block 236. If the user does not confirm, or the 2FA otherwise fails, then a message is sent to the video call software that the payment was not processed, at block 244. For example, the message may include details of why the payment failed. At this point, the video call software may prompt the user to initiate payment again. If the user refuses to pay, or otherwise does not pay, then the marketplace would post the invoice to the user's marketplace account for payment at a later time. For example, the user may be unhappy with the services rendered. In that case, the user may contest the invoice at a later time, or may choose to pay later.

According to aspects, once the payment has been processed, it is determined whether the payment was successful (e.g., whether the payment method was viable), at block 246. If not, then the payment fails, at block 244. If the payment is successful, the marketplace then notifies the video call software of the successful payment, at block 248. The video call software may then notify the user and the professional that the payment was successful, and may end the video call, at block 250, and the process flow 200 ends, at block 252.

According to aspects, if 2FA is not enabled (or required), at block 232, then once the marketplace confirms the credit card payment matches, the process flow 200 may proceed directly to block 236 for payment processing and confirmation at block 246 regarding whether the payment was successful, as described above.

Figure 3A:
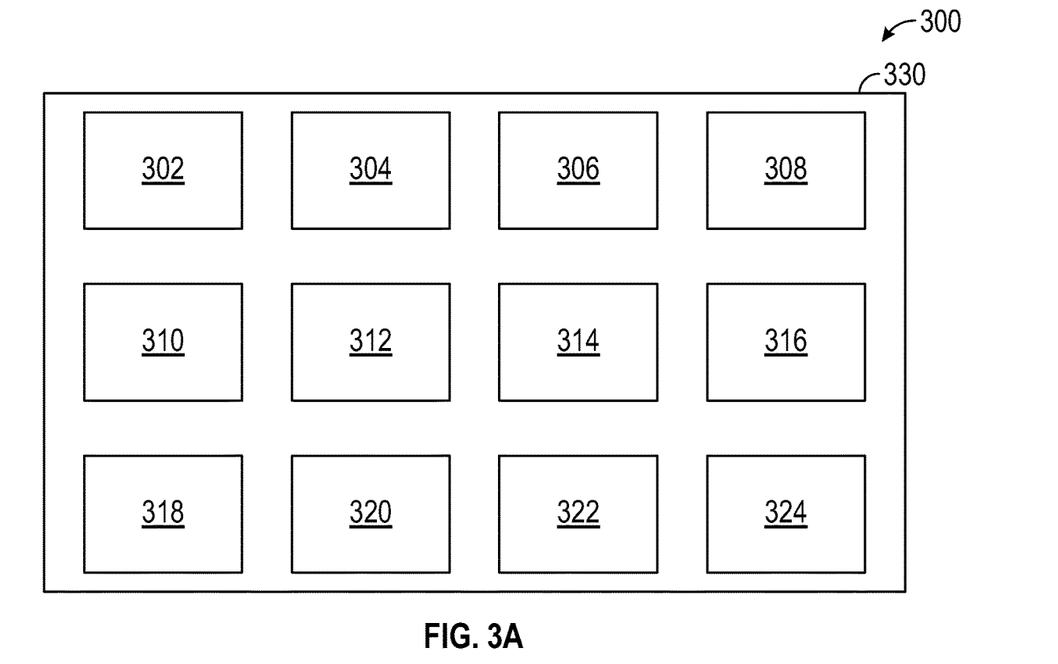
FIGS. 3A and 3B illustrate exemplary generated user interfaces (GUIs) for completing a payment over a video call, according to certain aspects of the disclosure.
Figure 3B:
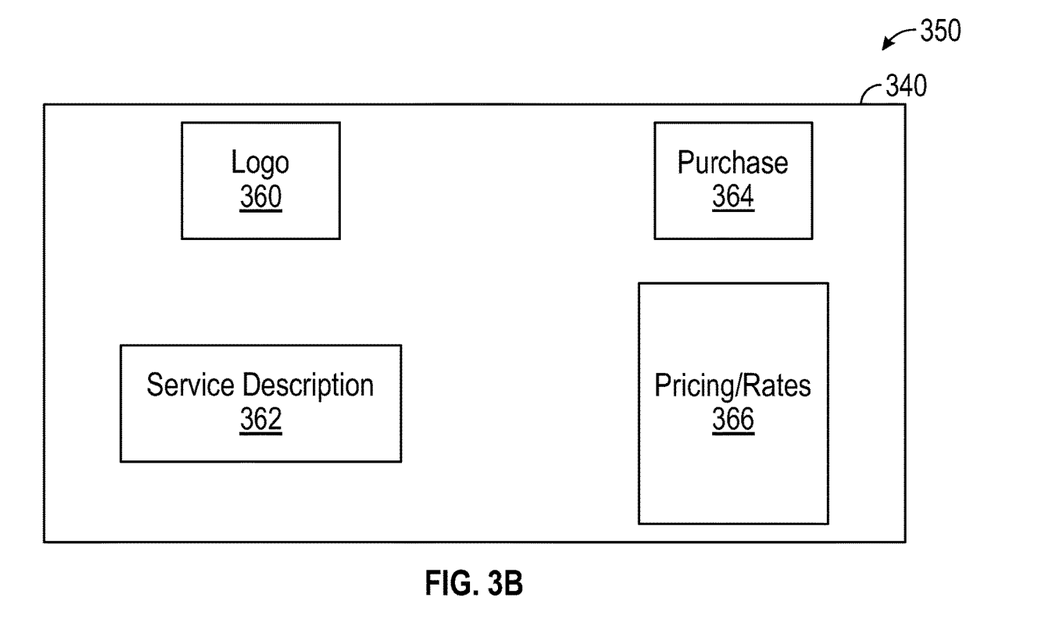

FIGS. 3A and 3B illustrate exemplary generated user interfaces (GUIs) 300 for completing a payment over a video call, according to certain aspects of the disclosure. Referring to FIG. 3A, a GUI 300 for an online marketplace 330 is illustrated. The online marketplace may include a menu 330 with multiple tiles 302-324, for example. Each tile 302-324 may correspond to a different vendor. It is understood that more or less tiles may be displayed, depending on how many vendors the marketplace allows.

According to aspects, a user (e.g., a customer) may have already registered with the online marketplace in order to access the menu 330 with the tiles 302-324. As described above, the user may select a vendor through a tile 302-324 by clicking the appropriate tile. For example, tile 302 may be for a service (e.g., by a professional, such as a doctor, lawyer, accountant, etc.). The other tiles 304-324 may be for other services by other professionals, and/or may be for products as well, or otherwise. The user may select one or more tiles to view additional details regarding each service/product being offered.

According to aspects, the video call software may include text prompts relating to the various steps described above. For example, text may be displayed, such as, "Your scheduled appointment has finished," when the video call has ended, and "Please check your phone to confirm your payment," to confirm payment. It is understood that other text that convey similar meanings may be displayed as well. It is further understood that other text for other purposes may be similarly generated and displayed. According to aspects, the text may be generated through either the marketplace and/or the video call software.

Referring to FIG. 3B, a GUI 350 for a selected tile 340 is illustrated. The GUI 350 may include a logo 360, a description 362, pricing 366 (e.g., flat fee, hourly, by the minute, etc.), and an option to purchase 364 for the selected tile 340. According to aspects, the option to purchase 364 may include an option to hold a video call with a provider of the service/product. In an implementation for a product, the user may wish to ask the provider questions regarding the product before purchasing. For example, a video call may be scheduled where the product may be discussed. The user may then choose whether to pay for the product (e.g., at a flat or variable/agreed upon fee), or not, at the end of the video call. In an implementation for a service, the video call itself may require payment. For example, the user may pay for a 30-minute consultation with a professional that charges by how long the video call will be. In either case, the user may schedule a meeting (e.g., via video call) with the provider of the service/product through the GUI 350.

According to aspects, the user may have selected tile 302 from the menu 330, so the GUI 350 may be for tile 302. It is understood that each tile may have its own GUI 350 with similar features as illustrated in FIG. 3B. It is further understood that any type of product/service may be included in the marketplace without departing from the scope of the disclosure.

According to aspects, the user may select multiple tiles and may schedule multiple video calls. Because the selecting and scheduling is through the marketplace, everything is tracked by the marketplace. In an implementation, the marketplace may notify the user that a scheduled meeting is upcoming, and may prompt the user to login to their marketplace account. For example, the user may login to the marketplace and initiate the video call through the appropriate tiles 302-324. At the conclusion of the video call, the marketplace may also keep track of all invoices, irrespective of their status (e.g., paid, unpaid, awaiting refund, etc.), by the user, in addition various other details, as described above in FIGS. 1 and 2. As a result, advantages include having everything conveniently located in one place through the marketplace for the user.

Figure 4:
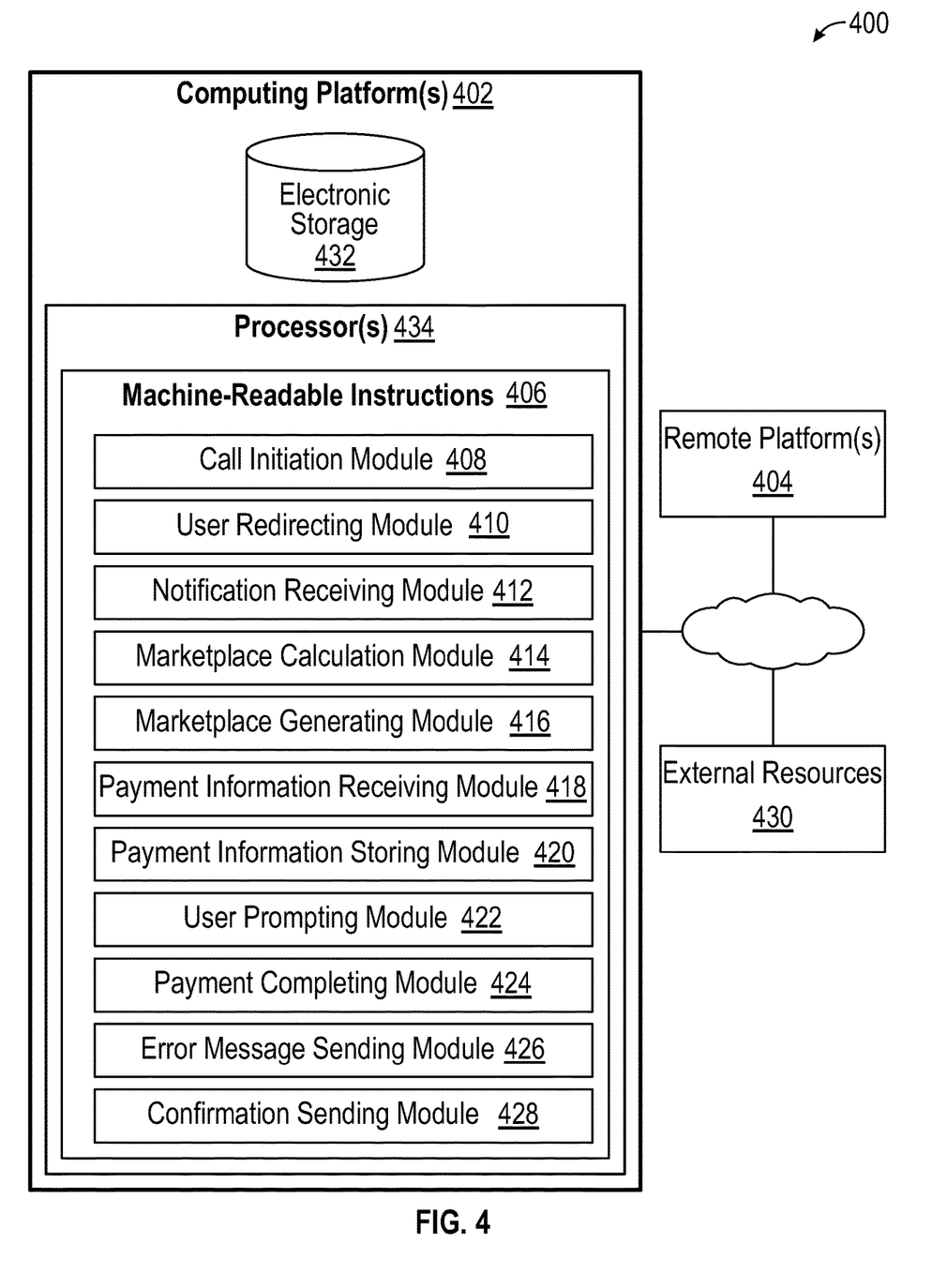
FIG. 4 illustrates a system configured for completing a payment over a video call, according to certain aspects of the disclosure.

FIG. 4 illustrates a system 400 configured for completing a payment over a video call, in accordance with one or more implementations. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of call initiation module 408, user directing module 410, notification receiving module 412, marketplace calculation module 414, marketplace generating module 416, payment information receiving module 418, payment information storing module 420, user prompting module 422, payment completing module 424, error message sending module 426, confirmation sending module 428, and/or other instruction modules.

Call initiation module 408 may be configured to initiate, by a user through an online marketplace, a video call between the user and a vendor. The user and the vendor may have a scheduled appointment with each other. The scheduled appointment may include a specified duration of time.

User directing module 410 may be configured to direct, by the online marketplace, the user to the video call through video call software during the specified duration of time.

Notification receiving module 412 may be configured to receive, from the video call software, a notification that the video call has ended. The notification may include video call metadata. The video call metadata may include at least a length of the video call.

Marketplace calculation module 414 may be configured to calculate, through the online marketplace, a total cost of the scheduled appointment based at least in part on the video call metadata and marketplace data. The marketplace data may include at least one of an hourly rate for the vendor or a flat fee for the vendor.

Marketplace generating module 416 may be configured to generate, through the online marketplace, an invoice based on the total cost.

Payment information receiving module 418 may be configured to receive payment information from the user in regards to the invoice. Receiving the payment information may include receiving, by the online marketplace, confirmation from the video call software that the user has displayed a valid payment method to the video call software. Receiving the payment information may include verifying, through the online marketplace, that the displayed valid payment method matches stored payment information for the user.

Payment information storing module 420 may be configured to store, by the user, the payment information in the online marketplace.

User prompting module 422 may be configured to prompt the user to pay the invoice.

Payment completing module 424 may be configured to complete payment of the invoice by charging the user based on the payment information. Completing the payment may include authenticating, by the user, the payment information through two-factor authentication.

Error message sending module 426 may be configured to send an error message to the user through the video call software if the payment information is declined.

Confirmation sending module 428 may be configured to send a confirmation to the user that the payment information was successfully accepted.

In some implementations, computing platform(s) 402, remote platform(s) 404, and/or external resources 430 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 430 may be operatively linked via some other communication media.

A given remote platform 404 may include one or more processors configured to execute computer program modules. The computer program modules may be configured to enable an expert or user associated with the given remote platform 404 to interface with system 400 and/or external resources 430, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 430 may include sources of information outside of system 400, external entities participating with system 400, and/or other resources. In some implementations, some or all of the functionality attributed herein to external resources 430 may be provided by resources included in system 400.

Computing platform(s) 402 may include electronic storage 432, one or more processors 434, and/or other components. Computing platform(s) 402 may include communication lines, or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 432 may comprise non-transitory storage media that electronically stores information. The electronic storage media of electronic storage 432 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 432 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 432 may include one or more virtual storage resources (e.g., cloud storage, a virtual private network, and/or other virtual storage resources). Electronic storage 432 may store software algorithms, information determined by processor(s) 434, information received from computing platform(s) 402, information received from remote platform(s) 404, and/or other information that enables computing platform(s) 402 to function as described herein.

Processor(s) 434 may be configured to provide information processing capabilities in computing platform(s) 402. As such, processor(s) 434 may include one or more of a digital processor, an analog processor, a digital circuit designed to process information, an analog circuit designed to process information, a state machine, and/or other mechanisms for electronically processing information. Although processor(s) 434 is shown in FIG. 4 as a single entity, this is for illustrative purposes only. In some implementations, processor(s) 434 may include a plurality of processing units. These processing units may be physically located within the same device, or processor(s) 434 may represent processing functionality of a plurality of devices operating in coordination. Processor(s) 434 may be configured to execute modules 408, 410, 412, 414, 416, 418, 420, 422, 424, 426, and/or 428, and/or other modules. Processor(s) 434 may be configured to execute modules 408, 410, 412, 414, 416, 418, 420, 422, 424, 426, and/or 428, and/or other modules by software; hardware; firmware; some combination of software, hardware, and/or firmware; and/or other mechanisms for configuring processing capabilities on processor(s) 434. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, 418, 420, 422, 424, 426, and/or 428 are illustrated in FIG. 4 as being implemented within a single processing unit, in implementations in which processor(s) 434 includes multiple processing units, one or more of modules 408, 410, 412, 414, 416, 418, 420, 422, 424, 426, and/or 428 may be implemented remotely from the other modules. The description of the functionality provided by the different modules 408, 410, 412, 414, 416, 418, 420, 422, 424, 426, and/or 428 described below is for illustrative purposes, and is not intended to be limiting, as any of modules 408, 410, 412, 414, 416, 418, 420, 422, 424, 426, and/or 428 may provide more or less functionality than is described. For example, one or more of modules 408, 410, 412, 414, 416, 418, 420, 422, 424, 426, and/or 428 may be eliminated, and some or all of its functionality may be provided by other ones of modules 408, 410, 412, 414, 416, 418, 420, 422, 424, 426, and/or 428. As another example, processor(s) 434 may be configured to execute one or more additional modules that may perform some or all of the functionality attributed below to one of modules 408, 410, 412, 414, 416, 418, 420, 422, 424, 426, and/or 428.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
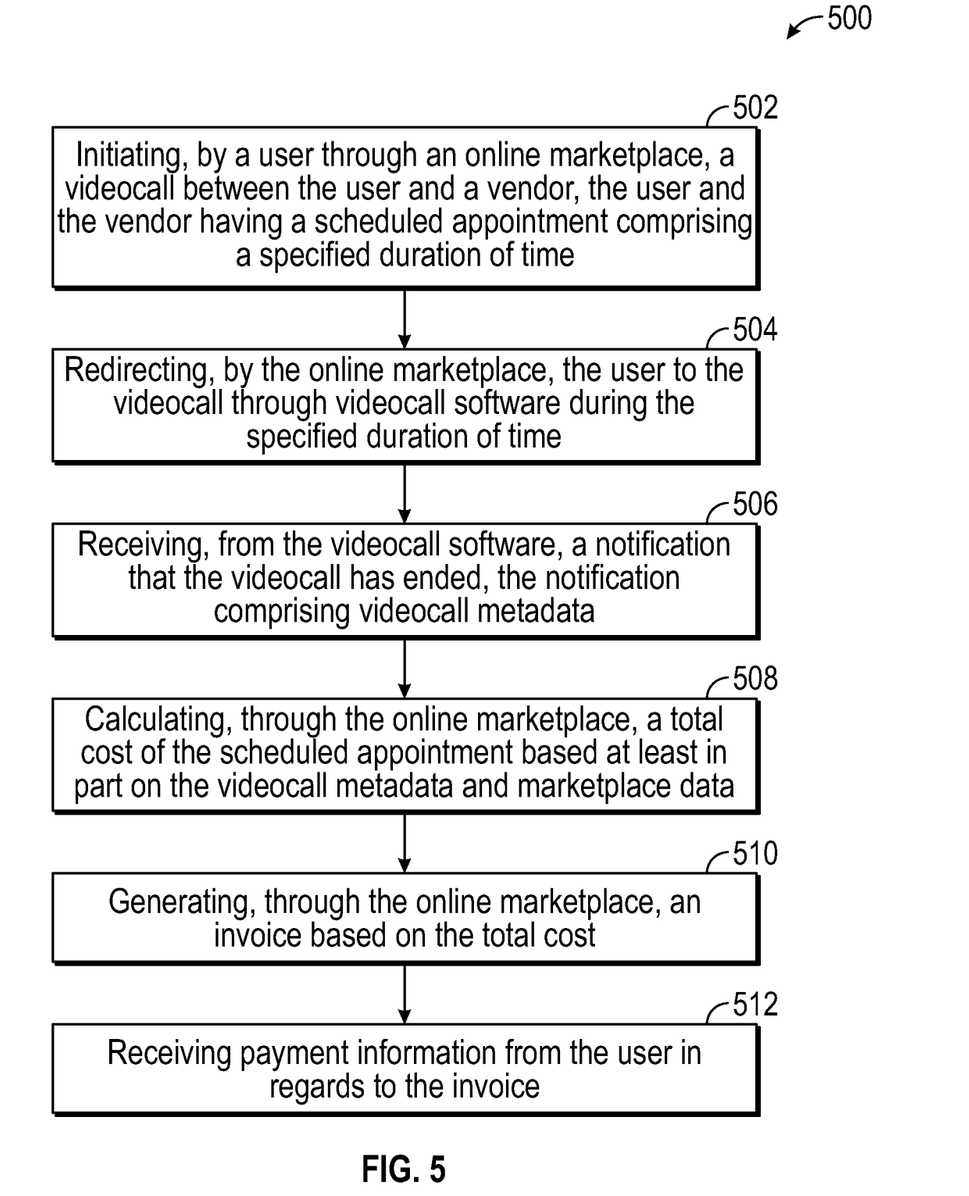
FIG. 5 illustrates an example flow chart for completing a payment over a video call according to certain aspects of the disclosure.

FIG. 5 illustrates an example flow chart (e.g., process 500) for completing a payment over a video call, according to certain aspects of the disclosure. For explanatory purposes, the example process 500 is described herein with reference to FIGS. 1-3. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIGS. 1-3.

At step 502, a video call is initiated by a user through an online marketplace between the user and a vendor, the user and the vendor having a scheduled appointment with each other, the scheduled appointment comprising a specified duration of time. At step 504, the user is directed by the online marketplace to the video call through video call software during the specified duration of time. At step 506, a notification is received from the video call software that the video call has ended, the notification comprising video call metadata. At step 508, a total cost of the scheduled appointment is calculated through the online marketplace based at least in part on the video call metadata and marketplace data. At step 510, an invoice is generated through the online marketplace based on the total cost. At step 512 payment information is received from the user in regards to the invoice.

For example, as described above in relation to FIGS. 1-3, at step 502, a video call (e.g., video call 122) is initiated (e.g., block 206) by a user through an online marketplace (e.g., marketplace 110, menu 330) between the user and a vendor (e.g., tiles 302-324), the user and the vendor having a scheduled appointment with each other, the scheduled appointment comprising a specified duration of time. At step 504, the user is directed (e.g., block 208) by the online marketplace to the video call through video call software (e.g., video call software 120) during the specified duration of time. At step 506, a notification is received from the video call software that the video call has ended (e.g., block 212), the notification comprising video call metadata (e.g., block 214). At step 508, a total cost (e.g., cost 102, pricing 366) of the scheduled appointment is calculated through the online marketplace based at least in part on the video call metadata (e.g., metadata 104) and marketplace data (e.g., block 216). At step 510, an invoice is generated through the online marketplace based on the total cost (e.g., block 218). At step 512 payment information is received from the user in regards to the invoice (e.g., block 222).

According to an aspect, the process 500 further includes storing, by the user, the payment information in the online marketplace. According to an aspect, the process 500 further includes prompting the user to pay the invoice.

According to an aspect, the video call metadata comprises at least a length of the video call. According to an aspect, the marketplace data comprises at least one of an hourly rate for the vendor or a flat fee for the vendor.

According to an aspect, receiving the payment information comprises receiving, by the online marketplace, confirmation from the video call software that the user has displayed a valid payment method to the video call software, and verifying, through the online marketplace, that the displayed valid payment method matches stored payment information for the user.

According to an aspect, the process 500 may further include completing payment of the invoice by charging the user based on the payment information. According to an aspect, completing the payment comprises authenticating, by the user, the payment information through two-factor authentication.

According to an aspect, the process 500 further includes, sending an error message to the user through the video call software if the payment information is declined. According to an aspect, the process 500 further includes sending a confirmation to the user that the payment information was successfully accepted.

Figure 6:
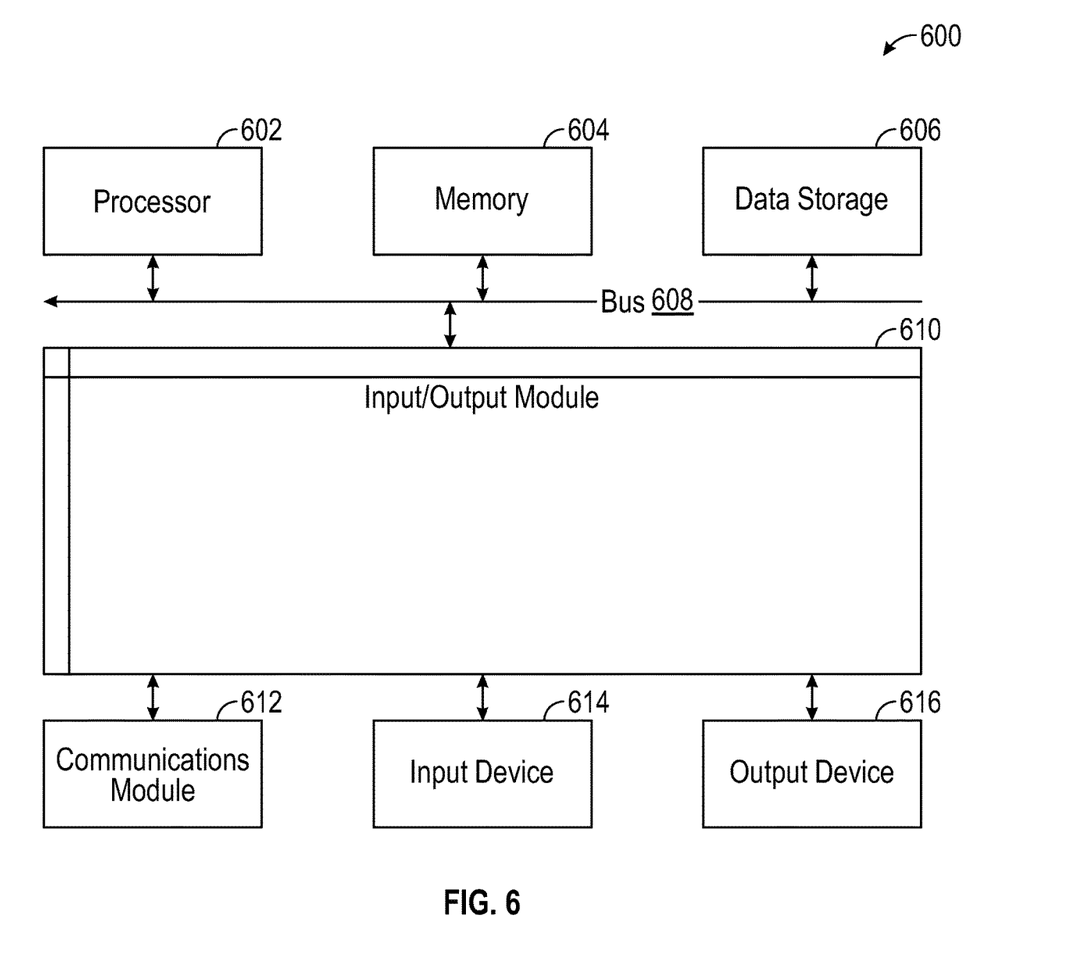
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network or the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for completing a payment over a video call, performed by executing machine-readable instructions, comprising:
    initiating, by a user through an online marketplace, a video call between the user and a vendor, the user and the vendor having a scheduled appointment with each other, the scheduled appointment comprising a specified duration of time;
    receiving at the marketplace, from a video call application, a notification that the video call has ended, the notification comprising video call metadata, wherein the video call metadata includes a facial presence of the user provided by facial recognition techniques;
    calculating, through the online marketplace, a total cost of the scheduled appointment based at least in part on the video call metadata and marketplace data;
    receiving payment information from the user in regards to an invoice, comprising the user displaying a valid payment method to the video call application;
    sending, from the online marketplace, a push notification to a mobile device with the user, the push notification requesting a user confirmation of the valid payment method to the video call application; and
    proceeding with the payment when the user confirms the push notification.

2. The computer-implemented method of claim 1, further comprising: storing, by the user, the payment information in the online marketplace.

3. The computer-implemented method of claim 1, wherein the valid payment method comprises a flash-to-pay option.

4. The computer-implemented method of claim 1, wherein a marketplace data comprises at least one of an hourly rate for the vendor or a flat fee for the vendor.

5. The computer-implemented method of claim 1, further comprising:
prompting the user to pay the invoice; and
receiving confirmation from the video call application that the user has paid the invoice.

6. The computer-implemented method of claim 1, wherein receiving the payment information comprises:
verifying, through the online marketplace, that the valid payment method matches stored payment information for the user.

7. The computer-implemented method of claim 1, further comprising: completing payment of the invoice by charging the user based on the payment information.

8. The computer-implemented method of claim 1,
wherein sending the push notification comprises verifying that the user has selected a two-factor verification option.

9. The computer-implemented method of claim 1, further comprising:
sending an error message to the user through the video call application if the payment information is declined.

10. The computer-implemented method of claim 1, further comprising: sending a confirmation to the user that the payment information was successfully accepted.

11. A system for completing a payment over a video call, comprising:
a processor; and
a memory comprising machine-readable instructions stored thereon, which when executed by the processor, causes the processor to:
initiate, by a user through an online marketplace, a video call between the user and a vendor, the user and the vendor having a scheduled appointment with each other, the scheduled appointment comprising a specified duration of time;
receive at the marketplace, from a video call application, a notification that the video call has ended, the notification comprising video call metadata, wherein the video call metadata includes a facial presence of the user provided by facial recognition techniques;
calculate, through the online marketplace, a total cost of the scheduled appointment based at least in part on the video call metadata and marketplace data;
receive payment information from the user in regards to an invoice, comprising the user displaying a valid payment method to the video call application;
send, from the online marketplace, a push notification to a mobile device with the user, the push notification requesting a user confirmation of the valid payment method to the video call application; and
proceed with the payment when the user confirms the push notification.

12. The system of claim 11, wherein to receive payment information the processor executes machine-readable instructions to store, by the user, the payment information in the online marketplace.

13. The system of claim 11, wherein the processor further executes machine-readable instructions to perform selecting a flash-to-pay option.

14. The system of claim 11, wherein a marketplace data comprises at least one of an hourly rate for the vendor or a flat fee for the vendor.

15. The system of claim 11, further comprising stored sequences of machine-readable instructions, which when executed by the processor, cause the processor to perform:
prompting the user to pay the invoice; and
receiving confirmation from the video call application that the user has paid the invoice.

16. The system of claim 11, wherein to receive the payment information the processor executes machine-readable instructions to perform verifying, through the online marketplace, that the valid payment method matches stored payment information for the user.

17. The system of claim 11, further comprising stored sequences of instructions, which when executed by the processor, cause the processor to perform: completing payment of the invoice by charging the user based on the payment information.

18. The system of claim 11, wherein the processor executes machine-readable instructions to verify that the user has selected a two-factor verification option.

19. The system of claim 11, further comprising stored sequences of machine-readable instructions, which when executed by the processor, cause the processor to perform: sending an error message to the user through the video call application if the payment information is declined.

20. A non-transitory computer-readable storage medium is provided including instructions that, when executed by a processor, causes the processor to perform a method for completing a payment over a video call, comprising:
initiating, by a user through an online marketplace, a video call between the user and a vendor, the user and the vendor having a scheduled appointment with each other, the scheduled appointment comprising a specified duration of time;
receiving at the marketplace, from the video call application, a notification that the video call has ended, the notification comprising video call metadata, wherein the video call metadata includes a facial presence of the user provided by facial recognition techniques;
calculating, through the online marketplace, a total cost of the scheduled appointment based at least in part on the video call metadata and marketplace data;
receiving payment information from the user in regards to an invoice, comprising the user displaying a valid payment method to the video call application;
sending, from the online marketplace, a push notification to a mobile device with the user, the push notification requesting a user confirmation of the valid payment method to the video call application; and
proceeding with the payment when the user confirms the push notification.

* * * * *